(12) United States Patent
Cannell

(10) Patent No.: US 7,637,367 B1
(45) Date of Patent: Dec. 29, 2009

(54) LOW PROFILE OVER-UNDER CONVEYOR

(75) Inventor: John Dana Cannell, Tigerton, WI (US)

(73) Assignee: H&CS Corp., Clintonville, WI (US)

( * ) Notice: Subject to any disclaimer, the term of this patent is extended or adjusted under 35 U.S.C. 154(b) by 0 days.

(21) Appl. No.: 12/217,918

(22) Filed: Jul. 10, 2008

(51) Int. Cl.
*B65G 47/34* (2006.01)

(52) U.S. Cl. .................... 198/465.3; 198/803.2

(58) Field of Classification Search .......... 198/465.1, 198/465.3, 803.2, 817
See application file for complete search history.

(56) References Cited

U.S. PATENT DOCUMENTS

| | | | | |
|---|---|---|---|---|
| 4,934,515 A | * | 6/1990 | Linden | 198/803.2 |
| 5,178,261 A | * | 1/1993 | Matheson et al. | 198/803.2 |
| 5,407,058 A | | 4/1995 | Gyger | 198/465.3 |
| 5,465,826 A | * | 11/1995 | Noestheden | 198/465.3 |
| 5,495,933 A | | 3/1996 | Gyger | 198/465.3 |
| 5,544,735 A | * | 8/1996 | Gyger | 198/465.3 |
| 5,873,452 A | * | 2/1999 | Nolan | 198/465.3 |
| 6,868,959 B2 | * | 3/2005 | Thomas et al. | 198/465.3 |
| 6,997,304 B2 | * | 2/2006 | Thomas et al. | 198/465.3 |

* cited by examiner

*Primary Examiner*—James R Bidwell
(74) *Attorney, Agent, or Firm*—Jeffrey S. Sokol; Cook & Franke S.C.

(57) ABSTRACT

This invention is a low profile, over-under conveyor with two continuously moving chain loops that form upper and lower tracks on which flexible work platforms ride. Each flexible platform includes two or more spaced metal slats joined by a thin flexible band. The slats include shoes that rest on and frictionally engage the moving chain loops. When one of the platforms reaches the end of one track, the flexible platform frictionally engages and compresses a pneumatic drive wheel and flexes to negotiate a low profile inversion and return on the other track. This allows the conveyor to handle long work platforms, while having a relatively low profile. Asynchronous accumulation and release of the freely moving flexible work platforms is accomplished using stop cylinders mounted inside the frame of the conveyor.

12 Claims, 6 Drawing Sheets

LOW PROFILE OVER-UNDER CONVEYOR

TECHNICAL FIELD OF THE INVENTION

This invention relates to a low profile over-under conveyor with a chain drive for same level movement of flexible work platforms, and a wheel drive for engaged rotational over-under movement of those flexible work platforms.

BACKGROUND OF THE INVENTION

Accumulating over-under conveyors are well known. These conveyors use chain loops that form tracks for supporting pallets that ride along tracks. The pallets have shoes for engaging the chain loops that form upper and lower tracks. The shoes engage the outside of the chain loop when traveling along the upper track, and the inside of the chain loop when traveling along the lower track. Examples of some over/under conveyor designs are disclosed in U.S. Pat. Nos. 5,495,933 and 5,407,058. These conveyor designs use two loops of triple roller strand conveyor chain that pass around sprocket assemblies. The head sprocket assembly includes a drive sprocket wheel. A series of pallets are positioned atop an upper segment of the chain loops. In the '933 design, each drive sprocket assembly includes a pallet drive disc. Each pallet drive disc has a series of spaced radiused pockets recessed into the perimeter of the disc to form a positive drive. The '058 design has a split disc gripper mechanism and tapered gripper bar to provide a friction drive in lieu of the positive drive. A pallet return that includes tapered ride bars and split disc gripper mechanisms is provided at the conveyor ends to swing the pallet down around sprockets and onto the lower return run, and then swing the pallets up onto the upper or advancing run. In these designs, the pallets can be linked into a pallet assembly to allow the conveyor to be used with larger work pieces. The pallets have a linking bar received over self-aligning bearings mounted on a roller mounting bolt.

A problem with conventional over/under conveyor designs is the vertical height require by the conveyor to invert their pallets or work platforms. For example, the '933 and '058 designs use individual pallets that are twelve (12) inches long. These long rigid pallets lift high and swing wide around both the drive and driven shafts. Although the pallets are linked, the conveyor still requires at least 18 inches of clearance from the floor to the centerline of its drive shafts. Yet, higher clearances can make it more difficult to load and unload the conveyer, particularly when bulky, heavy or awkward workpieces are being moved.

Another problem with conventional conveyors is they require precise alignment, particularly with respect to the pallet or work platform inversion mechanisms at the ends of the conveyor. For example, the '058 design requires highly machined and complicated components, such as split disc tapered gripper mechanisms. The '933 design requires a precise alignment of components parts. Slight misalignments and normal wear and tear can jam the conveyers and result in costly shut downs. Jamming is particularly troublesome with positive engagement inversion systems like the '933 deign which can bind and jam during use. Conveyor shut downs are particularly problematic because they can negatively impact an entire manufacturing operation.

Another problem with conventional over/under conveyor designs is the complexity of their design. The designs include many components that can break or jam during operation. The designs are also costly to manufacture and service.

The present invention is intended to solve these and other problems.

BRIEF DESCRIPTION OF THE INVENTION

The present invention relates to a low profile, over-under conveyor with two continuously moving chain loops that form upper and lower tracks on which flexible work platforms ride. Each flexible platform includes two or more spaced metal slats joined by a thin flexible band. The slats include shoes that rest on and frictionally engage the moving chain loops. When one of the platforms reaches the end of one track, the flexible platform frictionally engages and compresses a pneumatic drive wheel and flexes to negotiate a low profile inversion and return on the other track. This allows the conveyor to handle long work platforms, while having a relatively low profile. Asynchronous accumulation and release of the freely moving flexible work platforms is accomplished using stop cylinders mounted inside the frame of the conveyor.

One advantage of the present over-under conveyor invention is its low profile. The conveyor requires less than six inches of vertical clearance from the floor to the center line of its drive and driven shafts. Thin three inch wide slats joined by a thin flexible band create a flexible work platform that can negotiate a tight rotation around the relatively small diameter drive wheels. The resulting low profile over-under conveyer can be installed close to the ground for easy loading and unloading of the conveyor. The low profile over-under conveyor can also be installed close to a ceiling so that it will minimize or eliminate interference with other work being done in and around the conveyor.

Another advantage of the present low profile over-under conveyor is the unique simplicity of its design. The conveyer requires no special attachments to the pallets to drive them from the upper level to the lower level or vice versa and has a very smooth operation.

A further advantage of the present low profile over-under conveyor is its reliability. The flexible frictional engagement between the compressible pneumatic drive wheels and the flexible belt of the platforms is very forgiving. There are no special alignment concerns that must be maintained to properly operate the conveyor to prevent jamming and the shut down of the conveyor.

Other aspects and advantages of the invention will become apparent upon making reference to the specification, claims and drawings.

DESCRIPTION OF THE PREFERRED EMBODIMENTS

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
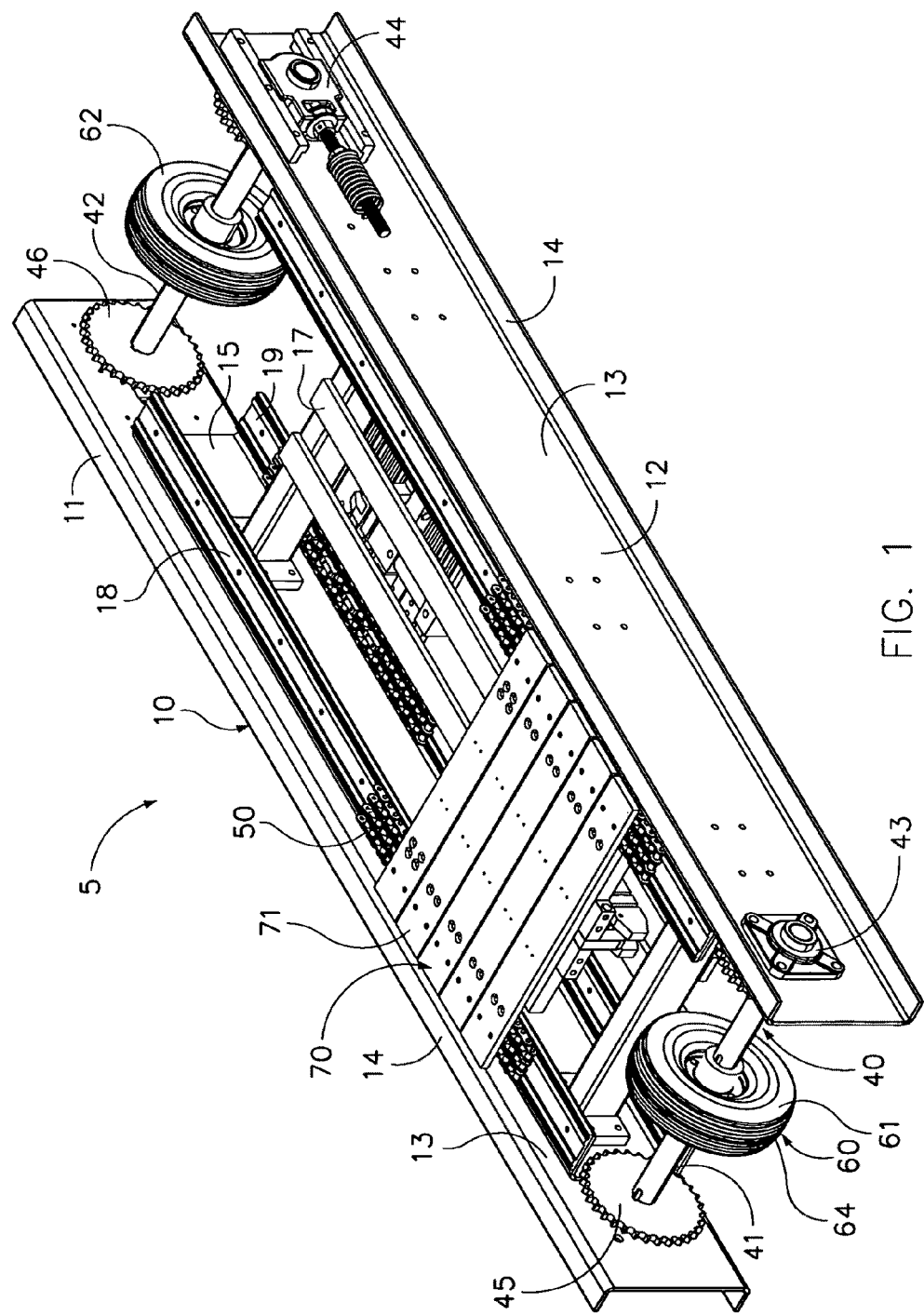
FIG. 1 is a perspective view of the low profile over-under conveyor with the drive chain cut away at the ends of the conveyor to show the drive and idler sprockets.
Figure 2:
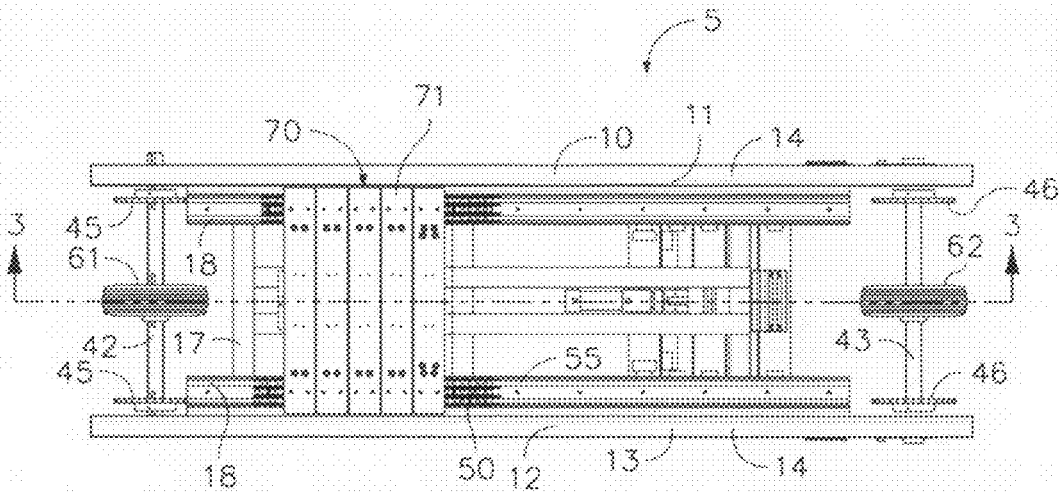
FIG. 2 is a top view of the over-under conveyor.

The present invention pertains to a low profile, asynchronous, accumulating over-under conveyor generally depicted by reference number 5 in FIGS. 1 and 2. The conveyor 5 uses two continuously moving chain loops 50 that form upper and lower tracks on which flexible work platforms 70 ride. When one of the platforms 70 reaches the end of one track, it frictionally engages and flexibly compresses a pneumatic wheel drive 60. The platform 70 also flexes to negotiate a low profile inversion and return on the other track. This allows the conveyor 5 to handle long work platforms 70, while having a relatively low profile. Asynchronous accumulation and release of the freely moving flexible work platforms 70 is accomplished using stop cylinders 25 mounted inside the frame 10 of the conveyor 5.

Figure 3:
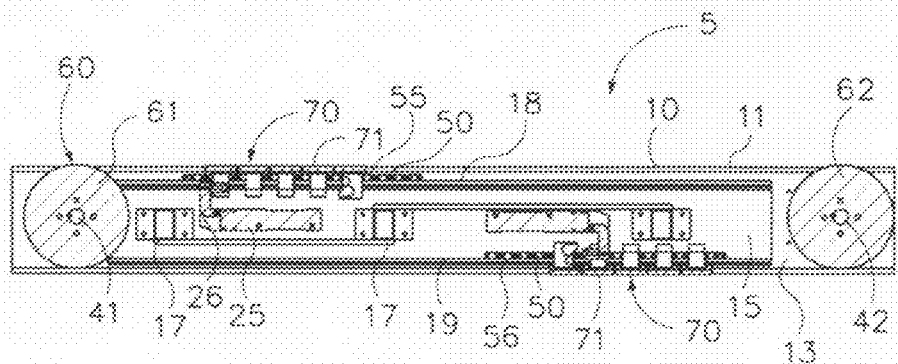
FIG. 3 is a side sectional view of FIG. 2 taken along line 3-3 showing the low profile over/under conveyor.
Figure 4:
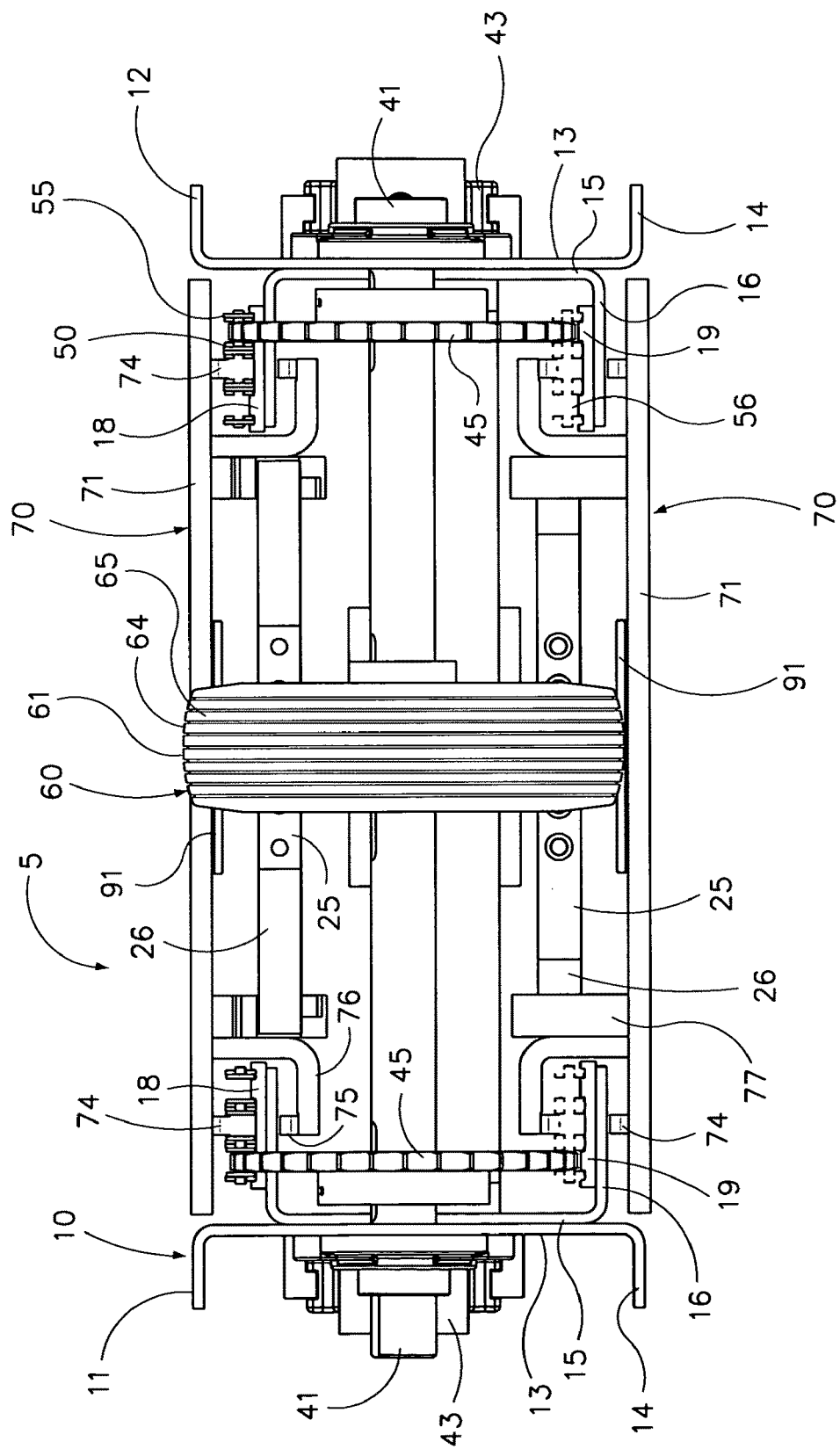
FIG. 4 is an end plan view of the low profile over-under conveyor.

The low profile conveyor 5 has a metal frame 10 with two side rails 11 and 12. Each rail 11 and 12 is formed by a larger outwardly facing flange 13 with outwardly extending upper and lower portions 14, and a smaller inwardly facing flange 15 with inwardly extending upper and lower portions 16. The low profile frame 10 and its rails 11 and 12 have a height of about 18 inches. The side rails 11 and 12 are connected side to side by cross members 17. Conveyor supports (not shown) are attached to the outer side flange 13 and preferably to its lower flange portion 14. Two sets of upper and lower chain guides 18 and 19 are secured to the inner flange 15 of each side rail 11 and 12 as best shown in FIGS. 3 and 4. Devices 25 for stopping the platforms 70 are located at various zones along the conveyor 5. Most conventional stop devices 25 are pneumatically powered, although conventional manual activation is also used.

The conveyor 5 includes a chain drive 31 for moving the platforms 70 along the length of the conveyor, and a wheel drive 60 for rotatingly inverting the platforms 70 at the ends of the conveyor. The chain drive 31 includes a drive shaft 41 located at one end of the conveyor frame 10 and a driven shaft 42 located at the opposite end of the flame 10. Each shaft 41 and 42 is supported by and spans between the side rails 11 and 12. The drive shaft 41 is rotatably held by opposed bearings 43 mounted on the side rails 11 and 12. The driven shaft 42 is rotatably held by opposed idler take up bearings 44 mounted on the side rails 11 and 12. The chain drive 31 includes two sets of two spaced sprockets 45 or 46. Each sprocket 45 and 46 has the same thin uniform shape, and a diameter of about 8 inches. Two drive sprockets 45 are rigidly fixed on the drive shaft 41. One drive sprocket 45 is proximal each side rail 11 or each side rail 11 or 12. Each drive sprocket 45 is in registry with one of the sets of upper and lower chain guides 18 and 19. Two driven sprockets 46 are rigidly fixed on the driven shaft 42. One driven sprocket 46 is proximal each side rail 11 or 12. Each driven sprocket 46 is in registry with one of the sets of upper and lower chain guides 18 and 19.

The chain drive 31 includes two conventional chain loops 50. Each loop 50 is three rollers 51, 52 and 53 wide, and is preferably a standard size 60-3 drive roller chain. One loop 50 is mounted on the set of sprockets 45 and 46 located proximal one side rail 11. The other loop 52 is mounted on the set of sprockets 45 and 46 located proximal one side rail 12. The drive and idler sprockets 45 and 46 of each loop 50 are centered on the outer rollers 51 of that loop. Each loop 50 forms an upper track 58 and a lower track 59. Each upper track 58 is supported by one of the upper chain guides 18. Each lower track 59 is supported by one of the lower chain guides 19. The outer and inner rollers 51 and 53 roll along raised chain guides 18 and 19. The middle roller 52 is supported by end rollers 51 and 53, and is free to rotate to allow the pallets to remain stationary when required without excessive drag and wear from the constantly moving chains 50.

The wheel drive 60 includes two conventional pneumatic wheels 61 and 62. Each wheel is preferably about 10 inches in diameter and about 3 to 4 inches wide, such as a conventional wheel barrel wheel. Each wheel 61 and 62 has an outer surface 64 that is slightly rounded from side-to-side. The rounded outer surface 64 is either smooth or treaded with radial grooves 65 extending radially around the wheel 61 or 62. The pneumatic wheels 61 and 62 are inflated within an inflation range of between about 5 psi to 30 psi to allow proper flexing or compression of the wheel and frictional engagement with flexible work platforms 70. The drive wheel 61 is typically located at the end of the conveyor 5 where the platforms rotate from the upper track 55 down to the lower track 56. This wheel 61 is typically inflated to the upper end of the inflation range, or about 15 psi to 30 psi. The driven wheel 62 is typically located at the end of the conveyor 5 where the platforms rotate from the lower track 56 up to the upper track 55. This wheel 62 is typically inflated to the lower end of the inflation range, or around about 5 psi to 15 psi. This different pressures of the wheels 61 and 62 is to accommodate the ⅜ inch gap between the upper and lower shoes 74 and 75, as discussed below.

Figure 5:
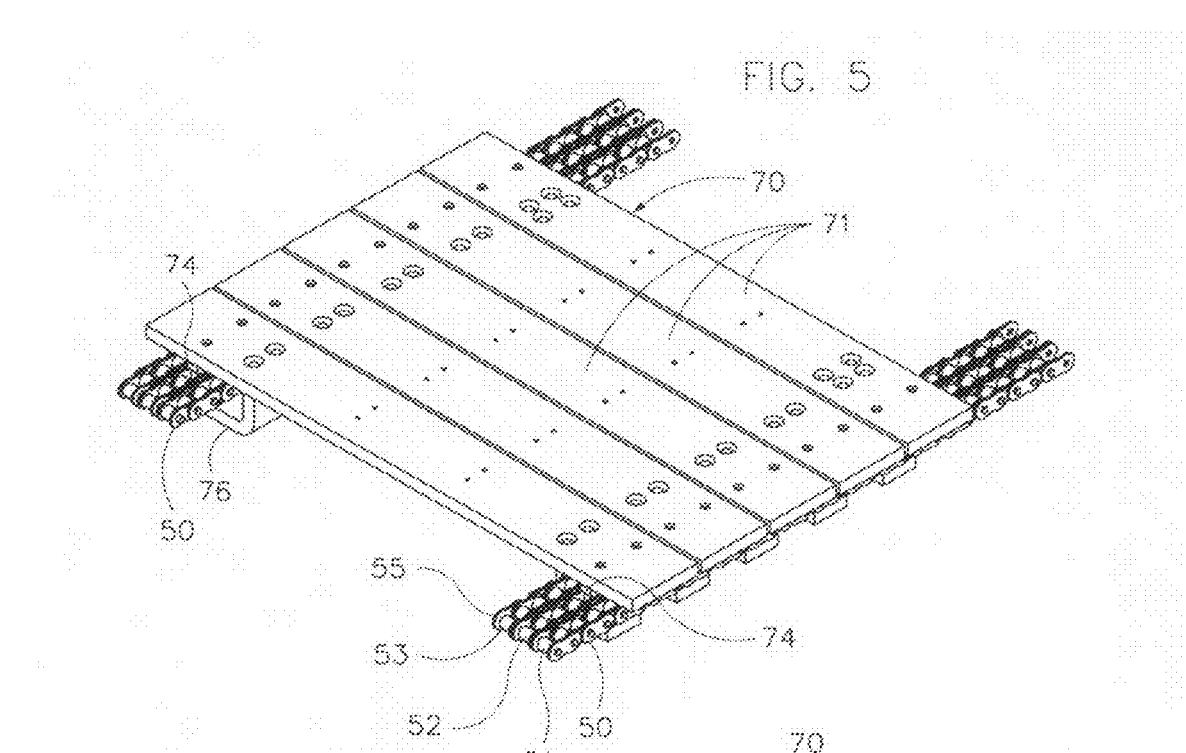
FIG. 5 is an enlarged perspective view of the flexible work platforms riding on the drive chain.
Figure 8:
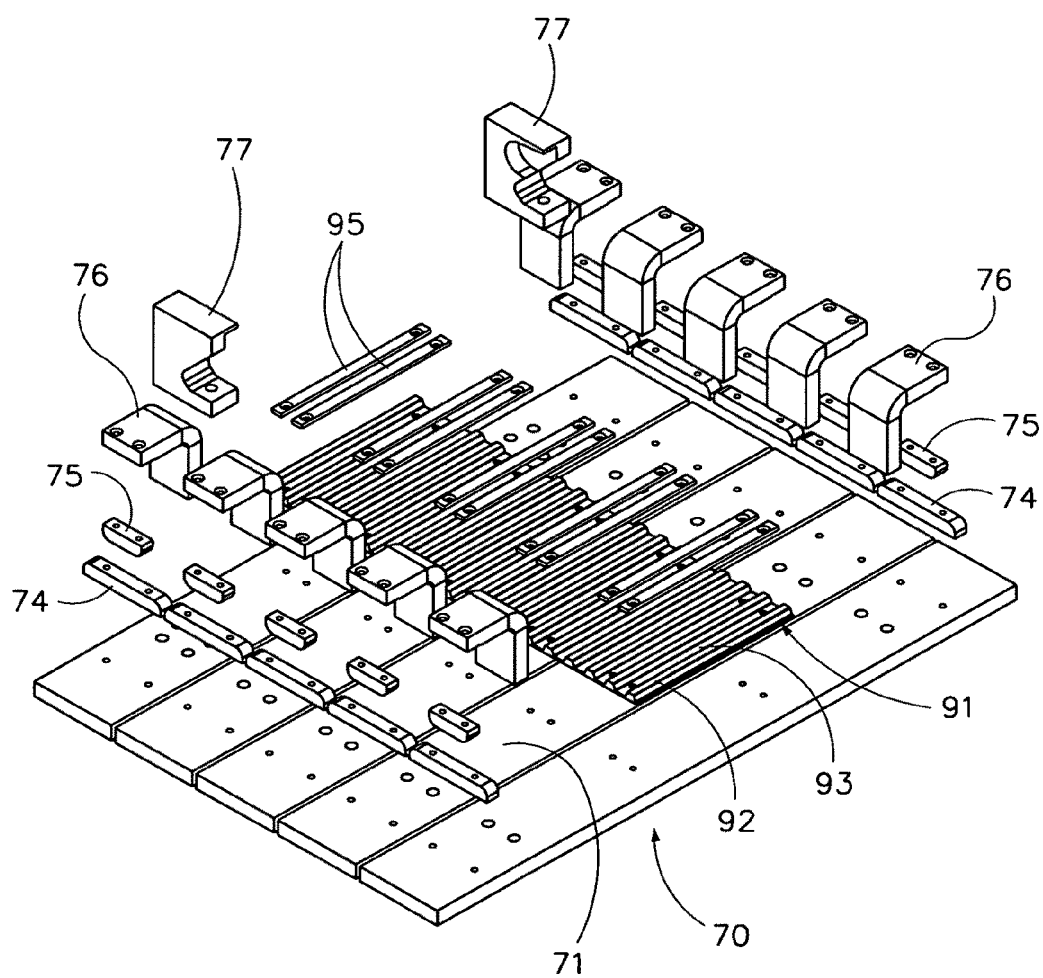
FIG. 8 is an exploded view of the flexible work platform.

Each flexible work platform 70 consists of two or more slats 71 as best shown in FIGS. 5 and 8. Each slat 71 is a flat plate made of rugged steel or aluminum and has smooth inner and outer surfaces. The slats 71 are preferably uniformly shaped. Each slat 71 has a width of about 3 inches, a thickness of about ½ inch, and is a length that depends on the width of the conveyor 5. The slats 71 are sufficiently long to engage and span between the two chains 50 forming the upper and lower tracks 55 and 56. The slats 71 are placed with their inner surface facing the chain loops 50. Adjacent slats 71 are spaced about ¹⁄₁₆ inches apart. The platforms 70 travel with the chains 50 along the tracks 55 and 56 of the conveyor 5. The weight of the slats 71 creates a friction engagement between the slats and the chain 50 so that the slats 71 are frictionally propelled by and move with the chains. Each flexible work platform 70 supports one or more workpieces or parts. The upper surface of the slats 71 can be smooth or include specific workpiece locating or supporting tooling. Non-slip rubber or urethane strips (not shown) can be attached to the top surfaces of the slats 71. Workpieces can also be suspended from the platforms 70 as they travel along the lower track 56 of the conveyor 5, such as via hangers or hooks specific to the workpieces. In this situation, the conveyor 5 is installed on tall supports or supported from the ceiling or an overhead structure.

Figure 6:
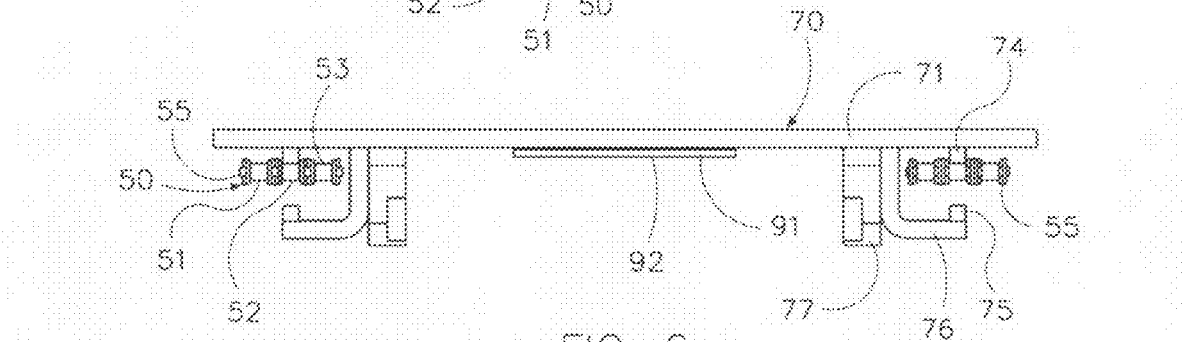
FIG. 6 is an end view of the flexible work platforms riding on the drive chain in the upper portion of the conveyor.
Figure 7:
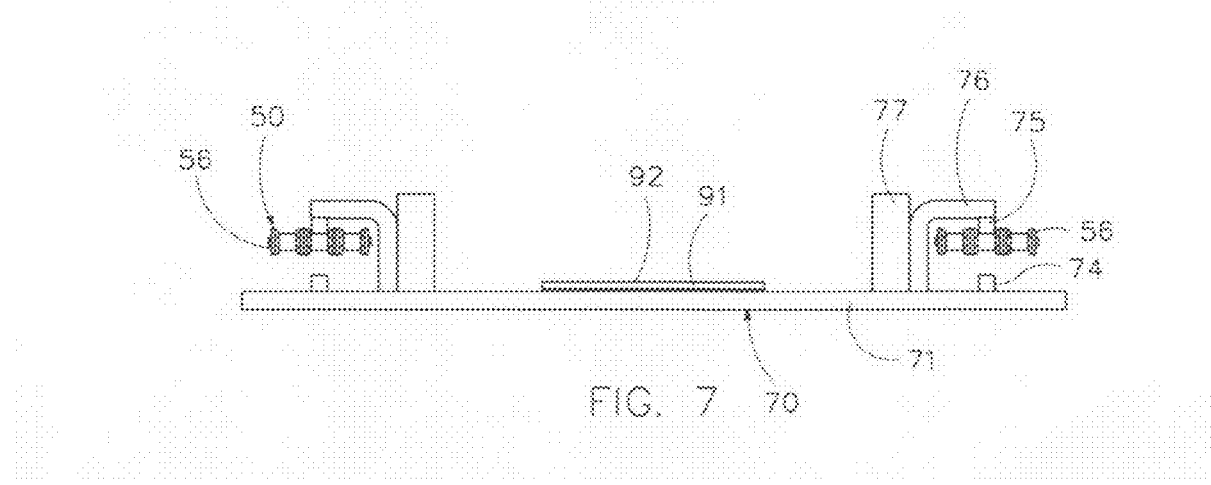
FIG. 7 is an end view of the flexible work platforms riding on the drive chain in the lower portion of the conveyor.

Each slat 71 has two spaced upper shoes 74 and two spaced lower shoes 75. Each end of the slat 71 has an upper shoe 74 and a lower shoe 75. The upper shoes 74 are secured directly to the underside of each slat 71. The shoes 74 are linearly aligned so that their lower friction bearing surfaces engage and ride in a grove formed by the upper surface of the middle roller 52 of its respective loop 50. The upper shoes 74 contact the moving chain 50 and supports the platform 70 as it proceeds along the upper track 55. (FIG. 6) The lower shoes 75 are secured to a J-shaped support 76 extending down from the underside of each slat 71. The J-shaped supports 76 are located so that they can extend around the chains 50 to engage the inner side of the chain 50. The lower shoes 75 are also linearly aligned so that their upper friction bearing surfaces engage and ride in a groove formed by the lower surface of the middle roller 52 of its respective loop 50. The lower shoes 75 contact the chain 50 and supports the platform 70 as it proceeds along lower track 56. (FIG. 7).

The upper and lower shoes 74 and 75 are in spaced linear registry so that each shoe 74 and 75 engages the middle 52 roller of the chain 50. The surfaces of the shoes 74 and 75 are spaced apart by a gap of about ⅜ inch to accommodate the chain 50 and its supporting flange 15 and guide 18 or 19. The shoes 74 and 75 laterally align the platform 70 and its slats 71 with the chains 50 as they move along the tracks 55 and 56 and as they move around the ends of the conveyor 5. Friction between the shoes 74 and 75 and chains 50 tend to hold the slats to the chain track so that they move together. Still, the shoes 74 and 75 are not fixed in or to any particular link of the chains 50. While the shoes 74 and 75 fit in the channel formed by the middle row 52 of the chains 50, they are free to slide along the length of the chains. The slats 71 do not include a "dog."

The last slat 71 in each flexible work platform 70 has two conventional stop blocks 77 on its underside. One stop block 77 abuts and is just inside the support 76 for each lower shoe 75. The height of the stop blocks 77 depends on the conveyor system. The stop block 77 is used to stop one or more pallets at a work zone or merely for accumulation of several pallets where required. The moving chains 50 pull the platforms 70 forward until the stop blocks 77 on the last slat 71 on the platform 70 engage a stopping device 25, whereupon the flexible work platform 70 remains stopped on the moving chains 50 until the stopping device 25 is released.

A flexible band of belting 91 connects the slats 71 forming each work platform 70. The band 91 is centrally located and bolted to the underside of each slat 71. The band 91 is about ½ inch thick, and is preferably a timing belt with strong longitudinal tension strands usually made of stainless steel, such as a conventional "Breco flex" timing belt. The upper surface of the belt 91 is smooth to flushly engage the underside of each slat 71. The lower surface of the belt 91 has a toothed profile 93 as shown in FIG. 8. The toothed profile 93 provides added frictional traction with the control wheels 61 and 62 as the platforms 70 traverse around the ends of the conveyor 5 from one track 55 or 56 to the other. The recesses in the toothed profile 93 also accommodate retaining strips 95 to secure the belt 91 to the slats 71. The retaining strips 95 distribute the load passing through the band laterally along the length of tooth abutting the strip to reduce load concentrations that can tear the belt 91 when the belt is simply attached via screws and the like.

The band 91 is strong enough to hold adjacent slats 71 parallel to each other so that they operate as one work platform 70. The slat 71 and band 91 construction of each platform 70 allows little longitudinal or lateral bending or stretching. The bands 91 allow rotational bending or flexing of the pallets 70 as they move around the sprockets 45 and wheels 61 and 62 at each end of the conveyor 5. The belt 91 does not align or guide the slats 71 with the chains 50 or wheels 61 and 62. But for the shoes 74 and 75, the slats 71 would be free to move laterally (from side-to-side) relative to the chain 50 and wheels 61 and 62.

Conveyor Operation

While the operation of the conveyor 5 should be readily understood based on the above description, the following is provided to assist the reader. During operation, each flexible work platform 70 supports one or more workpieces or parts. The platforms 70 travel in one direction along the upper track 55, and in an opposite direction along the lower track 56. As parts are conveyed past work areas, various operations may be completed as long as safety guidelines are followed. Each work area or accumulation zone has its own stop device 25. Slat stops allow the movement of the platforms 70 to be controlled at desired locations, and just prior to engaging the driven wheel 62, as discussed below.

One flexible work platform 70 at a time is released from the work or accumulation zone, using pneumatic cylinders 25 below the work platform 70. The cylinders 25 cause stop bars 26 to swing up to readily stop the next flexible work platform 70 moving along in line. An additional stop device 25 is located on the lower portion 23 of the conveyor 5, just before the idler sprocket 46. This allows flexible work platforms 70 to move up around the idler sprocket 46 one at a time instead of being held back by other pallets accumulated on the first portion of the upper part of the conveyor 5. This prevents wear between the always rotating idler control wheel 62 and a stopped flexible work platform 70. Long conveyors 5 may have additional stop devices 25 spaced along the upper and lower portion of the conveyor 5, either to limit the maximum number of flexible work platforms 70 behind any one stop device, or to position flexible work platforms correctly for work zones. Stop cylinders 25 are a pivoting type to which are attached stop bars (not shown) which are wide enough to intercept the stop blocks 77 under the pallet 70 when the stop bar is pivoted up into position. These stop bars are pivoted up before the pallet arrives and are pivoted back down when appropriate to release the pallet and allow the moving chains to convey it away.

Released one at a time under the "idler" end of the conveyor 5, each flexible work platform 70 is powered up and around the idler shaft 42 by the control wheel 62. The wheels 61 and 62 contact belt 91 on the underside of the slats 71, forcing them outward until the lower shoes 75 contact the chains 50 where they wraps around the sprockets 44 or 45 and wheels 61 or 62. The shoes tend to interlock somewhat with the chain itself and there is rotational force from friction between the wheels 61 and 62 and the slats 71 and flexible band 91. The band 91 maintains this friction force. At the downstream driven end of the conveyor 5, another set of sprockets 45 and control wheels 61 moves each pallet 70 down and around onto the lower track 56 of the conveyor.

Figure 9:
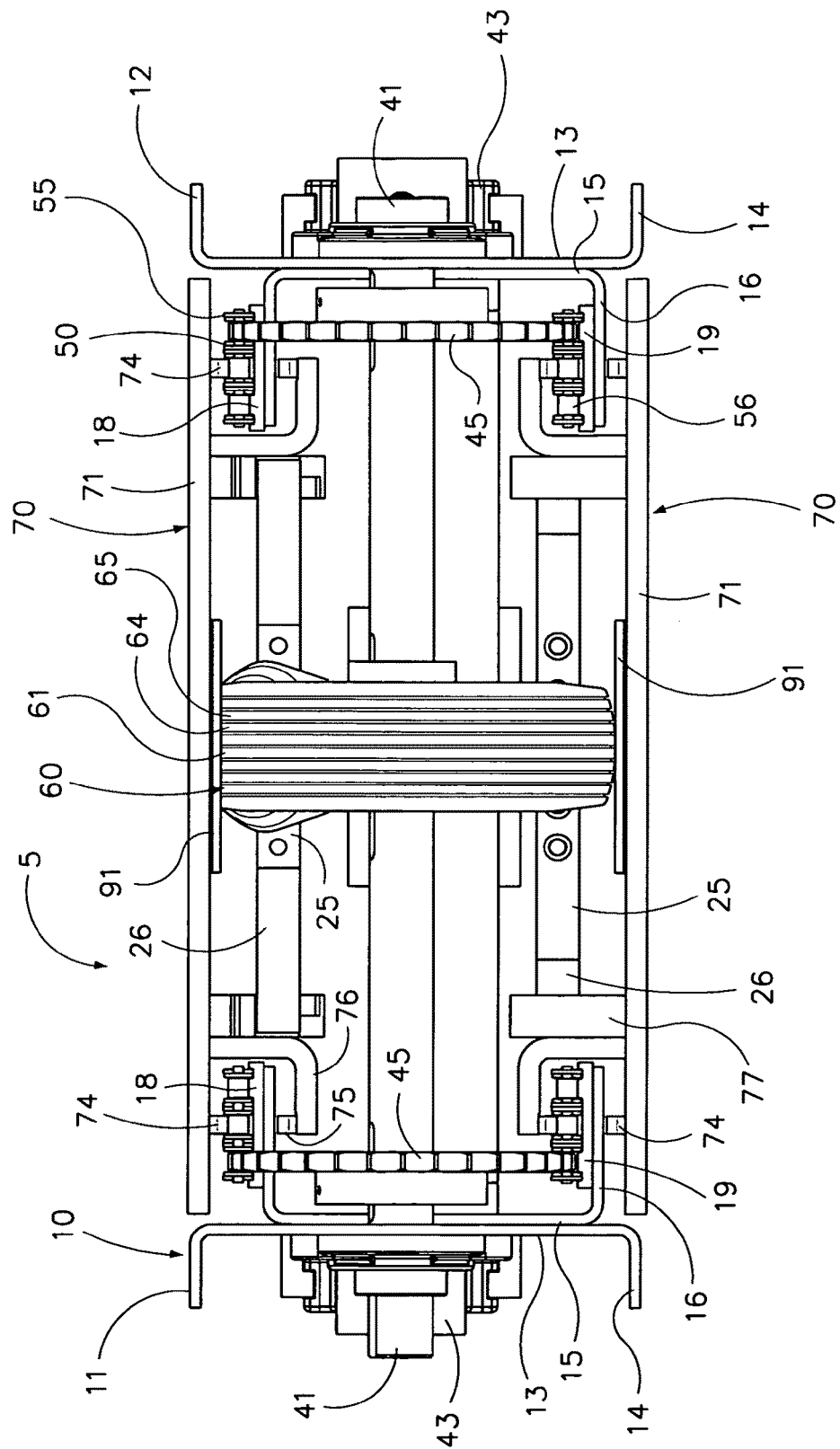
FIG. 9 is a end plan view showing the flexible work platform compressing the pneumatic drive wheel as it is being rotated from one track to another.

When the platforms 70 reach one end of the conveyor 5, the slats 71 are frictionally engaged by one of the rotating pneumatic wheels 61 as shown in FIG. 9. The platform 70 rides up onto and frictionally engages the rubbery surface of the pneumatic wheel 61 or 62, and the wheel flexibly compresses to receive the platform 71. The drive wheel 61 or 62 presses against the inner surface of the slats 71 and pushes them away from the chain 50 so that their upper shoes 74 disengage the chains 50. The wheel 61 or 62 pushes the slats outwardly until the lower shoes 75 engage and are guided by the middle row 52 of each chain 50. The frictional or gripping engagement between the drive wheel 61 or 62 and the slats 71, drives the slats around the spindle 45 or 46 while the alignment shoes 74 and 75 maintain the alignment of the slats 71 relative to the two chains 50, so that the slats 71 are ready to begin their travel on the opposite track 55 or 56. The upper and lower slat alignment shoes 74 and 75 that engage the middle row 52 of the chains 50 due to gravity or the drive wheel 61 are the only structure of the conveyor 5 to align or guide the slats 72 as they move along the chain tracks 55 and 56, and around the ends of the conveyor 5.

The drive wheels 61 and 62 flexibly and frictionally engage the slats 71 and flex belt 91 to provide a flexible friction drive. This flexible friction drive and friction engagement between the slats 71 and chains 50 help prevent binding between the slats, chain, spindles 45 and 46 and drive wheels 61 and 62. The slats 71 are selectively equipped with hangers for securing work pieces as shown in the drawings.

While the invention has been described with reference to a preferred embodiment, it will be understood by those skilled in the art that various changes may be made and equivalents may be substituted without departing from the broader aspects of the invention.

I claim:

1. An over-under conveyor for transporting workpieces, said over-under conveyor comprising:
    a support frame having first and second ends and first and second spaced elongated side rails, each said side rail having an inside surface and a set of upper and lower chain guides fixed to said inside surface;
    first and second chain loops that form upper and lower moving chain tracks, each said chain loop being aligned with and slidably held by one of said sets of upper and lower chain guides;
    a plurality of flexible platforms movingly supported by said chain loops and adapted to carry the workpieces along at least one of either said upper and lower chain tracks, each said flexible platform having a plurality of substantially rigid elongated slats joined together by a flexible band, each of said slats having an inside surface and being spaced apart from an adjacent slat to form an elongated flex joint, each of said slats having first and second sets of upper and lower shoes extending from its said inside surface, each of said upper shoes being linearly aligned to supportably engage said upper chain tracks and each of said lower shoes being linearly aligned to supportably engage said lower chain tracks;
    a chain drive assembly having a drive shaft rotatably fixed between said side rails at said first end of said conveyor and an idler shaft rotatably fixed between said side rails at said second end of said conveyor, each said shaft including first and second sprockets, each said sprocket having a uniform diameter, said first chain loop fixed on said first drive and idler sprocket, said second chain loop fixed on said second drive and idler sprocket, said drive shaft rotating said sprockets to propel said chain loops in one direction along their said upper track and an opposite direction along their said lower track, said chain loops rotatably driving said idler sprockets and idler shaft;
    a platform inversion assembly having first and second pneumatic wheels with an outer friction surface, each of said pneumatic wheels having a predetermined width and a diameter slightly larger than said uniform diameter of said sprockets, said one of said pneumatic wheels being fixed to and rotatably driven by said drive shaft and said other of said pneumatic wheels being fixed to and rotatably driven by said idler shaft; and,
    wherein each of said platforms is propelled along said upper track until said platform meets one of said one pneumatic wheels and is propelled along said lower track until said platform meets said other of said pneumatic wheels, said platform riding up onto and frictionally engaging said friction surface of said pneumatic wheel and said pneumatic wheel flexibly compressing to receive said platform, and said slats of said platform flexing at each said flex joint around said pneumatic wheel as said pneumatic wheel rotates said platform to said other of said upper and lower tracks.

2. The over-under conveyor of claim 1, and wherein said lower shoes of each of said platforms remain engaged with said chain loops as said pneumatic wheel rotates said platform to said other of said upper and lower tracks.

3. The over-under conveyor of claim 2, and wherein said flexible belt is centrally located along said inner side of said platform, and each of said pneumatic wheels engage said flexible belt when said pneumatic wheel rotates said platform to said other of said upper and lower tracks.

4. The over-under conveyor of claim 3, and wherein said flexible belt is a timing belt, said timing belt having a flat upper surface that lays flushly against and is firmly secured to each of said slats of said platform, and said timing belt having a lower surface with uniformly spaced flexible and friction enhancing ribs.

5. The over-under conveyor of claim 4, and wherein said timing belt is secured to each of said slats by a securement bar placed between adjacent ribs of said timing belt to produce a tear resistance securement of said timing belt.

6. The over-under conveyor of claim 4, and wherein each set of said upper and lower shoes is spaced bout ⅜ inch apart.

7. The over-under conveyor of claim 6, and wherein each said pneumatic wheel has a diameter of about 10 inches and is inflated to between about 5 psi and 40 psi.

8. The over-under conveyor of claim 7, and wherein each said sprocket has a diameter of about 8 inches, and said pneumatic wheel that rotates said platform from said upper track to said lower track is inflated to between about 5 psi and 15 psi, and said other pneumatic wheel that rotates said platform from said lower track to said upper track is inflated to between about 15 psi and 30 psi.

9. The over-under conveyor of claim 8, and wherein each of said pneumatic wheels is centrally located between said first and second sprockets on its said shaft.

10. The over-under conveyor of claim 1, and wherein said frame includes a stop device at a desired location and one of said slates of each of said flexible platforms includes a stop block, said stop device engaging said stop block to stop said work platform at said desired location.

11. The over-under conveyor of claim 1, and wherein each of said chain loops include outer and middle rollers, said sprockets engage said outer rollers, and said shoes engage said middle rollers.

12. The over-under conveyor of claim 1, and wherein said upper chain guides are horizontally coplanar, said lower chain guides are horizontally coplanar, and each said set of upper and lower chain guides are vertically aligned one above said other.

* * * * *